United States Patent

[11] 3,622,351

[72] Inventors John J. Cavallo
  Anaheim;
  Robert A. Reynolds, Santa Ana, both of Calif.
[21] Appl. No. 812,337
[22] Filed Apr. 1, 1969
[45] Patented Nov. 23, 1971
[73] Assignee Atlantic Richfield Company
  Philadelphia, Pa.

[54] TERTIARY-BUTYLHYDROPEROXIDE AS A BACTERICIDE FOR THE PRESERVATION OF FISH
5 Claims, No Drawings

[52] U.S. Cl. ........................................... 99/158,
  99/195, 62/1, 252/380
[51] Int. Cl. ........................................ A23b 3/00,
  A23b 3/06
[50] Field of Search ............................ 99/158,
  195, 160; 252/380, 186; 260/610; 424/338

[56] References Cited
UNITED STATES PATENTS

| 2,150,616 | 3/1939 | Thilenius ..................... | 99/192 |
| 2,176,407 | 10/1939 | Milas ........................... | 260/610 |
| 2,573,947 | 11/1951 | Bell et al. ..................... | 260/610 |
| 2,766,124 | 10/1956 | Upham et al. ................ | 99/150 |

OTHER REFERENCES

L. B. Jensen, Microbiology of Meats, 1945, page 376.
B. Albertson, Aureomycin as an Ice Additive for Fresh Fish, 1956, page 19, in Industrial Refrigeration.

Primary Examiner—Norman Yudkoff
Assistant Examiner—Hiram H. Bernstein
Attorneys—Grant L. Hubbard and D. W. Canady ABSTRACT: A process for using t-butylhydroperoxide for the control of bacterial growth on fish is disclosed.

TERTIARY-BUTYLHYDROPEROXIDE AS A BACTERICIDE FOR THE PRESERVATION OF FISH

BACKGROUND OF THE INVENTION

1. Field of the Invention

This invention relates to a process for using a known compound, t-butylhydroperoxide (TBHP) as a bactericidal agent. More particularly, this invention relates to a process for using TBHP as a bactericidal agent for the preservation of fish.

2. Description of the Prior Art

It is well known that fish are one of the most perishable of food products. In fact, the microbial degradation of fresh fish is the most important single factor in rendering this food product unavailable for the sale to the consumer. In an effort to overcome these losses the fishing industry has resorted to preservation by the partial removal of water, salt treatments, smoking, canning, freezing and chemical treatments. A recent review of current chemical methods being used and investigated by the fishing industry is presented by Shewan, J. M. and G. Hobbs, Progress in Industrial Microbiology, 6, 169–208 (1967). Chemical agents such as boric acid, salicylic acid, potassium nitrate, formaldehyde, sodium hypochlorite, carbon dioxide, chlorine, hydrogen peroxide acetic acid, hexamethylenetetramine, sulfur dioxide, benzoic acid, and sodium and potassium nitrites have been used in an attempt to control bacterial growth on fresh fish. More recently, the antibiotics, chlortetracycline, oxytetracycline, and chloromycetin have been tested and found to be effective. Public health organizations, however, have not entirely endorsed the use of these antibiotics in the preservation of food in the fear that this practice may result in the production of pathogenic micro-organisms resistant to these compounds.

There are two basic problems involved in using the aforementioned types of biocides: Cost-effectiveness and stability. Inhibitory concentrations of these compounds usually range between 1 part per million to 100 parts per million. Even at these low concentrations the use of some of the more expensive compounds becomes prohibitively costly. t-Butylhydroperoxide, however, is less expensive and its effective concentration range if between from about 5 parts per million to 50 parts per million.

In order for a compound to maintain long term biocidal effectiveness, the integrity, of the chemical structure, or that portion of the chemical structure that is antimicrobial, must be retained. Biocides such as quaternary ammonium compounds lose their antimicrobial activity in the presence of certain ions. Benzoic and salicylic acid are relatively stable, chemically, but many micro-organisms are capable of enzymatically degrading them. Most of the other compounds listed above have a deleterious effect upon the quality of the fish. None of these compounds, therefore, are used to any great extent for fish preservation.

t-Butylhydroperoxide has been shown by Milas and Harris, Journal of the American Chemical Society, 60, (8) 2434, (1938), to be very stable under ordinary conditions and in the presence of enzymes capable of degrading hydrogen peroxide and alkyl hydroperoxides. These workers were also able to show that t-butylhydroperoxide retained its peroxidic activity after being exposed to palladium black catalyst and 10 percent sodium hydroperoxide solution for several months. Other investigators have shown that t-butylhydroperoxide retains 50 percent of its activity after exposure to 100° C. for 165 hours in dilute benzene solutions.

The effectiveness of t-butylhydroperoxide as a germicide, fungicide, and the effectiveness of t-butylhydroperoxide as a bleach has been suggested by Milas, U.S. Pat. No. 2,176,407, but to our knowledge no process for utilizing this compound as a bactericide for the preservation of fish has heretofore been suggested.

SUMMARY OF THE INVENTION

It has now been discovered that t-butylhydroperoxide (TBHP), which has the following chemical structure,

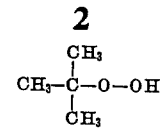

is an unusually effective bactericidal and/or bacteriostatic agent for the control of bacteria growing on fish. Therefore, it is a principal object of this invention to provide a method for controlling bacterial growth on fresh fish.

A more specific object of the invention is to provide a method for controlling or preventing the growth of bacteria on fish by the use of t-butylhydroperoxide.

The incorporation of TBHP in ice as a bactericidal and/or bacteriostatic agent constitutes a further object of this invention.

Other objects will become apparent from the specification which follows.

DESCRIPTION OF THE PREFERRED EMBODIMENT

It has now been discovered that t-butylhydroperoxide is an unusually effective bactericidal/bacteriostatic agent for controlling bacterial growth on fish. Aqueous solutions of this compound may be sprayed on both the fresh fish and fish fillets. The fish may also be dipped into appropriate aqueous solutions of the compound. The most effective way of utilizing this compound for fresh fist preservation is believed to be by incorporating the compound into ice used for shipboard storage.

TBHP in concentrations of from 5 p.p.m. to 50 p.p.m. can economically and effectively be used in preventing the growth of bacteria associated with low-temperature (4° C.) spoilage of fish. The preferred range is from 20 p.p.m. to 30 p.p.m. dissolved in water. The following examples described the use of TBHP to prevent growth of bacteria responsible for the spoilage of fish.

EXAMPLE I

A fillet of halibut was aseptically divided into three approximately equal parts (30–40 g.). One part served as a control and was placed unaltered into a petri dish and stored at 4° C. The remaining two parts were dipped in a 20 p.p.m. aqueous solution of TBHP, for 1 minute and 5 minutes, respectively. These samples were also placed in petri dishes and stored at 4° C. Viable cell counts were made on these samples at zero time, 4 days, and 12 days. The procedure used for obtaining the viable counts was as follows:

1. A portion of each sample was removed aseptically, weighed (approx. 1.0 gram) and placed in a sterile mortar and pestle.
2. The fish muscle was then ground into very fine particles.
3. Five milliliters of sterile saline solution (0.85 percent) was added and the mixture blended thoroughly.
4. The resultant solution was poured into a centrifuge tube and centrifuged for 15 minutes at 1,500 r.p.m.
5. The supernatant was transferred to a sterile graduate and diluted with additional sterile saline solution to a volume of 10 milliliters.
6. Serial 1:10 dilutions were made and plated on Tryptone Glucose Extract Agar.
7. After 2 days incubation at room temperature, the plates were counted. The data obtained from this experiment are presented in table I.

Table I

VIABLE CELL TITERS OF HALIBUT FILLET TREATED WITH TBHP AND STORED AT 4°C.

| Sample | Counts in Viable Cells/Gram Fish | | |
|---|---|---|---|
| | 0 days | 4 days | 12 days |

| | | | |
|---|---|---|---|
| Control—no TBHP treatment | 100×10⁵ | 1.2×10⁸ | 5.3×10⁶ |
| 20 p.p.m. TBHP dipped 1 minute | 6.9×10⁵ | 6.9×10⁷ | 4.0×10⁷ |
| 20 p.p.m. TBHP dipped 5 minutes | 1.0×10⁵ | 1.2×10⁶ | 8.3×10⁵ |

These data clearly show that t-butylhydroperoxide is a good chemical agent for controlling bacterial growth associated with fish spoilage.

Further, organoleptic examination of the fillet samples as to odor, color and texture left little doubt that the t-butylhydroperoxide had effectively controlled the growth of the "active bacterial spoilers." For example, while the control had a very strong and obnoxious "rotten fish" odor, the TBHP treated samples retained the fresh fish odor originally present. The texture of the control was poor, the flesh being quite soft. The 1 minute dipped sample still had its firm original texture. The 5 minute dipped sample was soft, indicating that the dip time was too long.

EXAMPLE II

The following experiment was carried out to demonstrate the effectiveness of t-butylhydroperoxide against a spectrum of organisms isolated from spoiled fish of many different types.

Several concentrations of t-butylhydroperoxide were incorporated into plates of Tryptone Glucose Extract Agar. These plates were inoculated with 24-hour cultures of 13 bacteria known to be "active fish spoilers." The plates were incubated at room temperature (24° C.) for 72 hours, after which they were examined for the presence of growth. The results of these studies are presented in table II.

These data illustrate the bactericidal effect t-butylhydroperoxide has upon bacteria which are primarily responsible for fish spoilage. The t-butylhydroperoxide is especially effective against the *Pseudomonas* species. These organisms are considered by many workers to be the greatest contributors to fish muscle deterioration.

TABLE II.—EFFECT OF TBHP ON BACTERIA ASSOCIATED WITH THE SPOILAGE OF FISH

[Agar Incorporated Method]

| Bacterium | Effective concentration, p.p.m. | | | | | | | | |
|---|---|---|---|---|---|---|---|---|---|
| | 0 | 5 | 10 | 15 | 20 | 25 | 50 | 75 | 100 |
| Pseudomonas sp. IV-57 | + | − | − | − | − | − | − | − | − |
| Pseudomonas sp. IV-90 | + | + | − | − | − | − | − | − | − |
| Aeromonas sp. 171 | + | + | + | + | − | − | − | − | − |
| Vibrio sp. 80 | + | + | + | + | + | − | − | − | − |
| Achromobacter sp. 16 | + | + | + | + | + | − | − | − | − |
| Achromobacter sp. T-93 | + | + | + | + | + | + | − | − | − |
| Achromobacter sp. C-184 | + | + | + | + | + | + | − | − | − |
| Achromobacter sp. C-205 | + | + | + | + | + | + | − | − | − |
| Pseudomonas sp. I-406 | + | + | + | + | − | − | − | − | − |
| Pseudomonas sp. II-320 | + | + | − | − | − | − | − | − | − |
| Pseudomonas sp. III-322 | + | + | − | − | − | − | − | − | − |
| *Acinetobacter moraxella:* | | | | | | | | | |
| No. 405 | + | + | − | − | − | − | − | − | − |
| No. 4212 | + | − | − | − | − | − | − | − | − |

NOTE.—Growth=+; no growth=−.

It will be understood that the foregoing examples are intended to illustrate the invention and that variations from the specific examples may be made without departing from the spirit and scope of the invention as defined in the following claims.

We claim:

1. A fish preservative composition comprising ice containing 5 p.p.m. to 50 p.p.m. t-butylhydroperoxide.
2. As an article of manufacture, fresh fish containing biocidally effective concentrations of t-butylhydroperoxide prepared by contacting fresh fish with aqueous solution containing 5 p.p.m. to 50 p.p.m. t-butylhydroperoxide.
3. A process for preserving fresh fish comprising treating said fish with aqueous solution containing t-butylhydroperoxide.
4. The process of claim 3 in which the concentration of t-butylhydroperoxide is from about 5 p.p.m. to about 50 p.p.m.
5. The process of preserving fresh fish comprising treating said fish with the composition of claim 1.

* * * * *